(12) United States Patent
Werenskiold et al.

(10) Patent No.: US 9,616,633 B2
(45) Date of Patent: Apr. 11, 2017

(54) SCREW EXTRUDER FOR CONTINUOUS EXTRUSION OF MATERIALS WITH HIGH VISCOSITY

(75) Inventors: Jens Christofer Werenskiold, Trondheim (NO); Lars Auran, Sunndalsøra (NO); Lillian Krakeli, legal representative, Sunndalsøra (NO); Hans Jørgen Roven, Trondheim (NO); Nils Ryum, Trondheim (NO); Oddvin Reiso, Sunndalsøra (NO)

(73) Assignee: Norsk Hydro ASA, Oslo (NO)

( * ) Notice: Subject to any disclaimer, the term of this patent is extended or adjusted under 35 U.S.C. 154(b) by 1967 days.

(21) Appl. No.: 12/515,497

(22) PCT Filed: Nov. 19, 2007

(86) PCT No.: PCT/NO2007/000408
§ 371 (c)(1),
(2), (4) Date: Jun. 4, 2010

(87) PCT Pub. No.: WO2008/063076
PCT Pub. Date: May 29, 2008

(65) Prior Publication Data
US 2010/0285165 A1    Nov. 11, 2010

(30) Foreign Application Priority Data
Nov. 20, 2006    (NO) .................................. 20065308

(51) Int. Cl.
*B21C 23/21* (2006.01)
*B30B 11/24* (2006.01)
(Continued)

(52) U.S. Cl.
CPC .......... *B30B 11/241* (2013.01); *B21C 23/005* (2013.01); *B21C 23/01* (2013.01);
(Continued)

(58) Field of Classification Search
CPC ....... B21C 23/005; B21C 23/01; B21C 23/21; B21C 23/212; B22F 3/20; B29C 47/0816;
(Continued)

(56) References Cited

U.S. PATENT DOCUMENTS 1,353,917 A * 9/1920 Lambert .................... 425/376.1
2,020,843 A * 11/1935 Lohner .......................... 426/513
(Continued)

FOREIGN PATENT DOCUMENTS

JP    2004-35961    2/2004

OTHER PUBLICATIONS

International Search Report issued Feb. 22, 2008 in the International (PCT) Application of which the present application is the U.S. National Stage.

*Primary Examiner* — Alison L Hindenlang
*Assistant Examiner* — Joseph Leyson
(74) *Attorney, Agent, or Firm* — Wenderoth, Lind & Ponack, L.L.P.

(57) ABSTRACT

A screw extruder for the continuous extrusion of materials with high viscosity, in particular metals such as aluminum and its alloys. The extruder includes an Archimedes screw (1) rotationally provided within a liner (2) of a screw housing (4) having an inlet (11) for the feeding of the material to be extruded, a compacting or extrusion chamber (5) and an extrusion die assembly with a die (6) which forms the shape of the extruded product (7). The required compaction takes place at the down-stream end of the screw towards the extrusion chamber (5) corresponding to up to 540° of the rotation of the screw, or up to 1.5 turns of the screw flight length. The solid plug of metal formed at the end of the screw and extrusion chamber (5) is restricted from rigid rotation to obtain the required compaction and extrusion pressure.

10 Claims, 2 Drawing Sheets

(51) Int. Cl.
*B21C 23/01* (2006.01)
*B29C 47/08* (2006.01)
*B21C 23/00* (2006.01)
*B29C 47/38* (2006.01)
*B29C 47/60* (2006.01)

(52) U.S. Cl.
CPC ............ *B21C 23/21* (2013.01); *B21C 23/212* (2013.01); *B29C 47/0803* (2013.01); *B29C 47/0816* (2013.01); *B29C 47/385* (2013.01); *B29C 47/6018* (2013.01); *B30B 11/246* (2013.01); *B30B 11/248* (2013.01)

(58) Field of Classification Search
CPC . B29C 47/385; B29C 47/6018; B30B 11/246; B30B 11/248
USPC ................. 425/204, 207, 208, 376.1, 461
See application file for complete search history.

(56) References Cited

U.S. PATENT DOCUMENTS 2,787,022 A    4/1957  Chisholm
5,318,432 A *  6/1994  Yagi et al. .................... 425/466

* cited by examiner

SCREW EXTRUDER FOR CONTINUOUS EXTRUSION OF MATERIALS WITH HIGH VISCOSITY

BACKGROUND OF THE INVENTION

1. Technical Field

The present invention relates to a screw extruder for the continuous extrusion of materials with high viscosity, in particular metals such as aluminum and its alloys, the extruder including an Archimedes screw provided in a screw housing with an inlet for the feeding of the material to be extruded, a compacting or extrusion chamber and an extrusion die assembly with a die which forms the shape of the desired extruded product.

2. Description of the Related Art

Extrusion of materials with high viscosity such as aluminium requires a considerably high pressure to force the aluminum through the die block and the die, typically 100 to 500 MPa. The state of the art as regards aluminium extrusion is today and has been for the last 100 years, dominated by ram extrusion. Ram extrusion is a batch process in which a billet is loaded into a container and forced (pressed) through the die by means of a moving piston. One mentionable method for continuous extrusion of aluminum is the so-called CONFORM® process which is based on the use of a single revolving wheel as the driving force in an extrusion process and which enables the manufacture of products of unlimited length. In its simplest form, the wheel has a single groove in its periphery which accepts the feedstock and transfers the material to the extrusion zone and die.

Another continuous screw extrusion process is used in the production of lead and lead alloy profiles which is based on the Robertson Hansson extruder (U.S. Pat. No. 3,693,394). In this process the lead is fed to the extruder in liquid state and solidifies during the extrusion process.

Lead behaves differently from aluminum since it has "sliding" friction, i.e. the friction between the lead and the container material (steel) is proportional to the pressure. Aluminum and most other metals have, however, sticking friction at the extrusion temperatures, i.e. the aluminum welds to the container and the screw material.

As a result of this behavior, screw extrusion of aluminum and other sticky metals with high viscosity have been difficult and non-practical due to the enormous forces required to overcome the frictional forces between e.g. aluminum and steel.

BRIEF SUMMARY OF THE INVENTION

The present invention provides a new and improved screw extruder which is not encumbered with the above problems of sticking and which provides a consistent, continuous process for the extrusion of materials with high viscosity such as aluminum.

BRIEF DESCRIPTION OF THE DRAWINGS

The invention will be further described in the following by way of example and with reference to the drawings where.

DETAILED DESCRIPTION OF THE INVENTION

When extruding viscous and sticking materials such as metals in a continuous process by means of screw extruders, an increasing pressure is produced due to the dragging of the material which sticks to the liner and the screw surfaces along the extruder, reaching the pressure necessary to force the material through the die at the end of the housing. Unlike the typical screw extruder used in the polymer industry where the viscosity of the polymer is very much lower than in metals, the pressure zone has to be substantially reduced in order to avoid too high torsion forces on the extruder. This is achieved by a special design of the screw in combination with an extrusion chamber designed in order to restrict rotational flow of the metal. Also, the temperature profile along the extruder has to be controlled. The total length of the screw is therefore also considerably shorter, typically 1.5-2.5 times the screw diameter.

The extruder is preferably fed with granular metal at $T<T_s$, where $T_s$ is the temperature at which the metal will have sticking friction. The granular metal may be heated in the extruder by contact with the screw and container wall, or it may be preheated to the desired temperature. As sticking friction occurs, the metal is further heated by frictional heat and deformation. As the semi compacted metal reaches the pressure generating zone, the metal sticks to an already compacted "wing" of metal and becomes kneaded and fully compacted.

Figure 1:
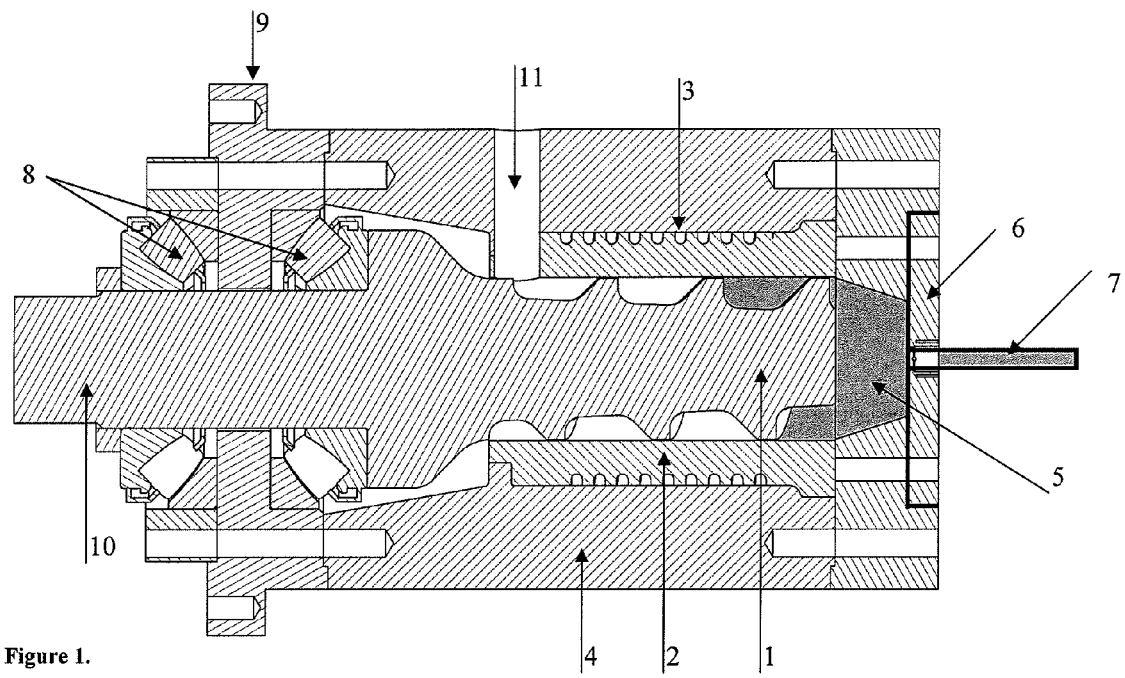
FIG. 1 is a cross sectional view of an extruder according to the present invention.

The extruder according to the invention includes, as shown in FIG. 1, a screw housing or container 4 with an inner liner 2 within which is rotationally provided an Archimedes screw 1 with a helical tread or flight. The liner 2 is provided with cooling channels 3 to control the temperature under the extrusion process. The up-stream end of the container or housing 4 is provided with an inlet 11 for the supply of granular material to be extruded. At the outlet end of the container/liner, 2, 4, by the downstream end of the screw 1, is provided an extrusion chamber 5, and further at the end of this chamber is provided a die assembly 6 which forms the shape of the profile 7 to be extruded. The screw 1 is preferably stabilized by a thrust bearing assembly 8 fitted in a support plate 9 releasably mounted to the container 4. A screw shaft 10 connects the screw 1 to a drive unit through a suitable connection.

Figure 2:
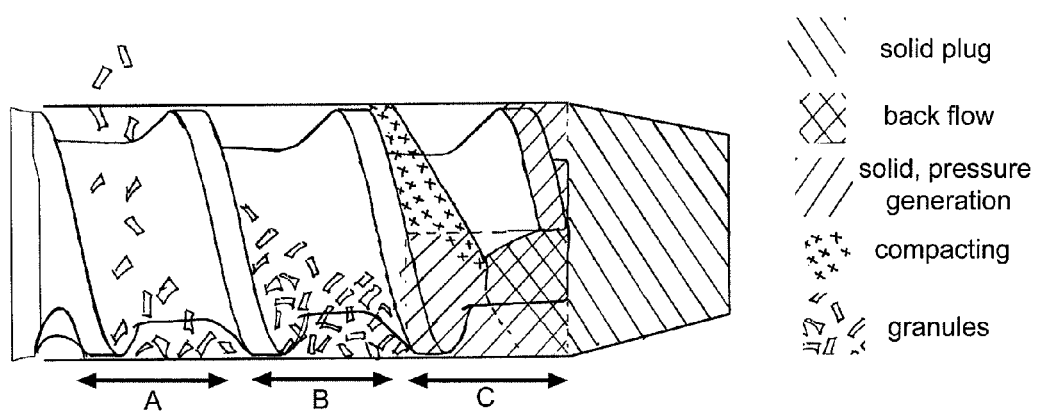
FIG. 2 is a side view of the screw shown in FIG. 1, further viewed in sections.

The design of the screw may be viewed in relation to three sections as shown in FIG. 2 a feeding zone, A a transport zone, B and a pressure generating and compacting zone, C.

The screw is designed to ensure that the granules can be transported freely from the feeding zone A to the transport zone B until the material, by the build up of pressure at the end of the screw, stick to the metal in the pressure generating and compacting zone C. This can be done by reducing the screw core diameter from the feeding section to the pressure generating section in a linear, progressive or digressive manner, or by increasing the outer screw diameter or a combination of both.

In the feeding zone A, the material to be extruded is fed through the inlet 11 to the screw in the container/liner assembly 2, 3, either by the force of gravity or by other means. The material arrives in the open space between the screw and the liner and as the screw rotates, and the material is transported further into the transport zone B.

In the transport zone B, the material is further transported and may, if not pre-heated prior to feeding, be heated to T>Ts by contact between the liner wall and screw. Further, on entering the pressure generation zone C compression of the material takes place, the material begins sticking (to each other, to liner and to screw surface) and is kneaded and further heated, thus forming a plug of solid material towards the end of the screw before entering the extrusion chamber 5.

Tests with different aluminium alloys proves that the required compaction necessary for extrusion takes place at the last part of the screw corresponding to up to 540°, or up to 1.5 turn of the screw flight length. However, some tests proved that required compaction took place at even shorter flight lengths, even below 360°. This represents, as indicated above, an important feature with the present invention. It is quite likely to believe that the reason why researchers formerly have not succeeded with the continuous extrusion of materials like aluminum, is that the design of the extruders they have used, e.g. the long screws and compaction area, has caused redundant frictional work whereby more energy (much higher rotational momentum) would have to be supplied to the process. It is thus of utmost importance that the design of the screw and housing is such that the compaction takes place over a short distance (area) of the screw.

Further, it is necessary for the solid plug to stick to the housing (and the screw) in order for the forward dragging of the plug to occur. The sticking must be prevented from collapsing into a highly localized shear deformation zone adjacent to the liner wall surface with a resulting drastic reduction of the viscosity and a locally rapid increase in temperature.

Still further, it has been proved by testing that the solid plug of metal in the extrusion chamber 5 must be restricted from rigid rotation to obtain the required compaction pressure. This can be done by designing the walls of the chamber with a shape or providing the surface of the chamber with a desired roughness, for instance with inwardly extending protrusions (not shown), such that rotation is avoided.

Figure 3:
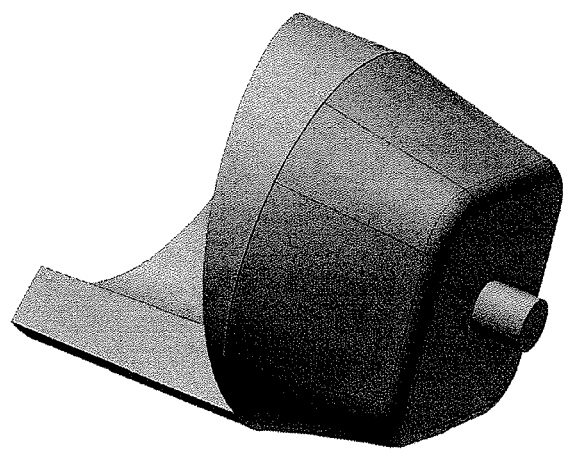
FIG. 3 is a perspective view of the compression chamber of the extruder of FIG. 1.

FIG. 3 shows an example of a design where the front end of the extrusion chamber 5 has close to a square cross sectional shape.

The compacted material contained in the pressure generating section of the screw is completely welded to the plug and liner wall, and is therefore also restricted from rotating. As the compacted material in the screw is restricted from rotating and the screw rotates, the rotational energy of the screw is transferred into a net forward flow of material into the extrusion chamber.

As the volume of material fed into the screw per turn is smaller than the volume of the flight, part of the material flows back into the space between the flights from the extrusion chamber. This represents an important part of the working principle of the invention as it generates a high amount of shear deformation such that the material in the extrusion chamber becomes fully dense. The shear deformation breaks down the oxide layer on the granules making the "welds" between granules complete. The shear deformation also aids in breaking down particles, such as iron containing particles in aluminum, thereby reducing them in size.

The extruder according to the present invention may be used for the extrusion of a number of materials with high viscosity such as:

All sticky metals (such as: light metal alloys, Al, Mg, Ti)
Mechanical mixtures of metals
Granular materials.
Mixtures of metals and compounds.
Metal swarfs and fines, e.g. turnings.

The invention as defined in the claims is not restricted to the above examples. Thus, the screw and extrusion chamber may not include heating in the transport zone B as described above, but instead the material may be pre-heated before it is fed to the extruder.

The invention claimed is:

1. A screw extruder system for the continuous extrusion of high viscosity metal, the screw extruder system comprising:
   a metal to be extruded;
   a screw housing including an inner liner and an inlet formed in an upstream end of the screw housing for feeding the metal to be extruded;
   an Archimedes screw transporting the metal, the Archimedes screw being rotationally provided within the liner of the screw housing;
   an extrusion die assembly including a die configured to shape the extruded product; and
   an extrusion chamber formed between a downstream end of the screw and the extrusion die assembly,
   wherein the screw and inner liner define a compaction zone at a downstream part of the screw towards the extrusion chamber such that compaction of the metal takes place in the compaction zone,
   wherein the compaction zone corresponds to up to 540° of the rotation of the screw, or up to 1.5 turns of the screw flight length, and
   wherein a required compaction and extrusion pressure is obtained by the compacted metal in the compaction zone and a solid plug of metal in the extrusion chamber is restricted from rigid rotation.

2. The screw extruder system according to claim 1, wherein the required compaction takes place at the downstream end of the screw towards the extrusion chamber corresponding to up to 360° of the rotation of the screw, or up to 1.0 turn of the screw flight length.

3. The screw extruder system according to claim 1, wherein the restriction of rotation is obtained by the configuration of the extrusion chamber or by an inner surface of the extrusion chamber.

4. The screw extruder system according to claim 1, wherein the extrusion chamber has a square cross section at a downstream end thereof.

5. The screw extruder system according to claim 1, wherein the inner surface of the extrusion chamber is provided with inwardly extending protrusions.

6. A screw extruder system for the continuous extrusion of metal including aluminum and aluminum alloys, the screw extruder system comprising:
   a metal to be extruded;
   a screw housing including an inner liner and an inlet formed in an upstream end of the screw housing for feeding the metal to be extruded;
   an Archimedes screw for transporting the metal, the Archimedes screw being rotationally provided within the inner liner of the screw housing;
   an extrusion die assembly including a die for forming the shape of the extruded product;
   an extrusion chamber formed between a downstream end of the screw and the extrusion die assembly,
   wherein compaction of the metal takes place in a compaction zone at the downstream end of the screw towards the extrusion chamber corresponding to up to 540° of the rotation of the screw, or up to 1.5 turns of the screw flight length, and wherein a required compaction and extrusion pressure is obtained by the compacted metal formed in the compaction zone and by restricting rigid rotation of a solid plug of metal in the extrusion chamber.

7. The screw extruder system according to claim 6, wherein:
the inner liner and the screw define a feeding zone communicating with the inlet, an intermediate transport zone, and a pressure generating and compacting zone communicating with the extrusion chamber,
the feeding zone is disposed upstream of the transport zone,
the pressure generating and compacting zone is disposed downstream of the transport zone, and
the zones are formed by reducing a core diameter of the screw from the feeding section to the pressure generating and compacting zone.

8. The screw extruder system according to claim 7, wherein the extrusion chamber is configured so that rotation of a solid plug of metal in the extrusion chamber is restricted.

9. The screw extruder system according to claim 8, wherein a front end portion of the extrusion chamber has a cross sectional shape that is substantially square.

10. The screw extruder system according to claim 7, wherein inner walls forming the extrusion chamber are provided with inwardly extending protrusions to restrict rotation of the solid plug of metal in the extrusion chamber.

\* \* \* \* \*